Oct. 25, 1932.  K. A. WESSBLAD  1,884,939

REFRIGERATING APPARATUS

Filed Aug. 26, 1924

Inventor
K. A. Wessblad
By Marks & Clerk
Attys.

Patented Oct. 25, 1932

1,884,939

UNITED STATES PATENT OFFICE

KARL ALEXANDER WESSBLAD, OF STOCKHOLM, SWEDEN, ASSIGNOR, BY MESNE ASSIGNMENTS, TO ELECTROLUX SERVEL CORPORATION, A CORPORATION OF DELAWARE

REFRIGERATING APPARATUS

Application filed August 26, 1924, Serial No. 734,334, and in Sweden September 22, 1923.

The present invention relates to refrigerating systems of the absorption type.

An absorption apparatus in general includes a heat absorbing part, such as an evaporator, and a heat delivering or heat rejecting part, such as the absorber or condenser. The heat absorbed into the system has generally been carried away by means of cooling water. Using cooling water, however, is inconvenient in many cases since it requires access to a cooling water supply main.

The present invention has for its main object to improve the cooling of absorption refrigerating systems and, in accordance with the invention, the generally used cooling water system is replaced by an air-cooled system which contains a volatile fluid and is in heat transfer relation with the heat rejecting portion of the primary system and which may, for convenience, be termed a secondary system. In the preferred embodiment of the invention, heat is transferred from the heat delivering portion of the primary refrigerating system to the air of the atmosphere through the intermediary of a closed circulating system or member arranged in heat exchange relation with a heat rejecting portion of the primary system and containing a condensible agent which is caused to circulate automatically through the secondary system due to difference of temperature of different parts thereof, said agent thus passing through a thermodynamic cycle, being gasified or vaporized in that part of the secondary system which is in heat exchange relation with the primary refrigerating system and then condensed into liquid form in an air-cooled condenser included in the secondary system. In this manner the heat to be conducted off from the primary system is taken up by the heat-carrying agent in the form of heat of vaporization and is conveyed by means of the vapor to the air-cooled condenser, from which it is delivered to the surrounding air while the vapor is condensed. As a result of this complete cycle of vaporization and condensation of the heat transfer fluid, a large quantity of heat can be transferred by means of a relatively small quantity of the circulating agent and, in addition, the transfer of heat from the primary refrigerating system to the air-cooled condenser can take place without any appreciable loss of heat, so that practically the whole drop of temperature available may be utilized in the air-cooled condenser. The arrangement has the further advantage that the circulation is effected automatically without mechanical circulating devices and the air-cooled condenser may be disposed at any desired level above the primary refrigerating apparatus or system and at any desired distance from the latter.

Further, in accordance with the invention, I also utilize a vaporization-condensation cycle member to convey heat to the primary system.

Still further, my invention provides an advantageous means for cooling several heat rejecting parts of an absorption refrigerating system by a common cooling source.

Further objects, characteristics and advantages of my invention will become apparent as the description proceeds, which will be presented with reference to the accompanying drawing diagrammatically showing several embodiments of the invention, and which drawing constitutes a part of this specification.

Figure 1:
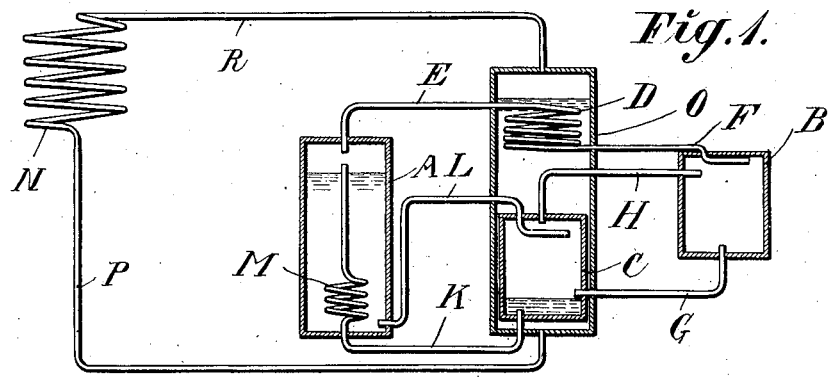
Fig. 1 is a diagrammatic illustration of absorption refrigerating apparatus embodying the invention.

Referring more particularly to Fig. 1 of the drawing, the primary system includes a generator A, an evaporator B, an absorber C, and a condenser D. The different parts of the apparatus are connected by means of pipes E, F, G, H, K, and L so as to form a closed circulating system. All parts of this system are arranged in open communication with one another so as to allow the same pressure to be maintained throughout the system. The primary system contains a suitable refrigerant or cooling agent, for instance, ammonia, and a suitable absorption liquid for the refrigerant to be circulated through the generator and the absorber, and an inert gas, for instance hydrogen, to be circulated through the evaporator and the absorber.

The primary refrigerating system operates as follows: On heating the generator A, the ammonia is expelled from solution and is caused to flow through the pipe E to the condenser D, in which it is condensed and from which it passes in liquid state to the evaporator B through the pipe F. In the evaporator B the refrigerant evaporates, the vapor thereof mixing with and diffusing into the inert gas. The evaporation and diffusion of the refrigerant results in absorption of heat from the evaporator and its surroundings. A mixture of vapor of refrigerant and inert gas is thus formed which flows downwardly, on account of its weight, through the evaporator and through pipe G, to the lower part of the absorber C in which the vapor of the refrigerant is absorbed by absorption liquid weak in ammonia. The absorption liquid enters the absorber through the pipe L. The inert gas, which is not soluble in the absorption liquid, is separated out and caused to return through the pipe H to the evaporator B, in which it is again mixed with vapor of the refrigerant. Circulation of the absorption liquid is maintained by means of a circulator-siphon M inserted in the pipe K, said siphon being adapted to raise the liquid to a level in the generator which is high enough to cause the absorption liquid in the lower part of the generator to flow into the absorber through the pipe L.

The primary system thus described is known per se and is of the kind disclosed in British Pat. No. 202,602 and U. S. Pat. No. 1,609,334 of December 7, 1926.

In order to cool the primary or refrigerant condenser D and the absorber C, I provide an air-cooled condenser N and a container O arranged in open communication with each other and connected by means of pipes P and R so as to form a gas-tight, or hermetically sealed, closed circulating system. The container O encloses the absorber C and the refrigerant condenser D, which constitute the heat delivering parts of the primary refrigerating system from which heat is to be transferred to the atmosphere. The transfer of heat from these parts of the refrigerating apparatus to the air-cooled condenser N is accomplished, according to the invention, by means of a condensible agent contained in the circulating system ORNP, said agent, when wholly in liquid condition, occupying only a certain part of the circulating system. The said agent is so selected with respect to the temperatures of the surrounding air and the primary condenser D that, in operation, it will be caused to boil in the container O and to condense in the condenser N.

Due to vaporization of the liquid in container O, heat is drawn off from the primary condenser D and absorber C in the form of heat of vaporization, which heat is then transferred by flow of the vapor of the volatile liquid to the air-cooled condenser N, from which the heat is conducted to the atmospheric air, while the volatile fluid or heat transfer agent is condensed to liquid form. The air-cooled condenser N is disposed above the container O in order to allow the liquefied agent to flow directly, by gravity, into the container O. The circulation of the heat transfer agent is maintained exclusively on account of the difference between the temperatures of the condensers D and N. Inasmuch as the volatile heat transfer agent passes from the container O to the air-cooled condenser N in gaseous condition, the location of the air-cooled condenser N relative to the refrigerating apparatus and its distance therefrom may be chosen as desired, it being merely necessary to dispose the condenser at the level required in relation to the primary refrigerating system.

If the pipe R is well insulated, the circulation may obviously be maintained without any appreciable drop of temperature between the condensers D and N, it being thus possible to utilize, in the air-cooled condenser N, nearly the whole drop of temperature between the surrounding air and the heat-delivering parts of the primary system. This is of particular importance, in case the temperature of the surrounding air is high. Assuming, for instance, that the refrigerator is to be used in a tropical climate, the normal temperature of the air being, for instance, 45 degrees C. (approximately 110 degrees F.), the temperature of the primary condenser D, having regard to the pressure in the primary refrigerating system, should not be higher than 65 degrees C. (approximately 150 degrees F.), this temperature corresponding to a pressure in the apparatus of about 30 atmospheres (approximately 440 pounds per square inch). Furthermore, the heat transfer agent and the pressure in the secondary circulating system ORNP are to be chosen so that the heat transfer agent will boil at 65 degrees C., it being then possible to utilize in the air-cooled condenser N nearly the whole drop of temperature and, as a consequence, the pressure within the primary refrigerating system may, in general, be kept within moderate limits, even in the case where the surrounding air has a high temperature.

Figure 2:
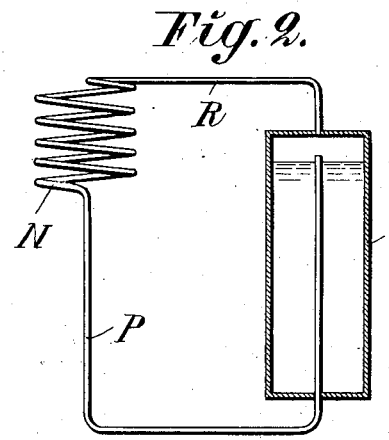
Fig. 2 shows a modification of the secondary or heat transfer system.

The quantity of liquid contained in the circulating system ORNP is to be chosen so as to cause the liquid level in the container O to be maintained above the primary condenser D. In order to prevent the condenser D from being uncovered by the surrounding liquid due to temporary fluctuations of liquid level in the container O, the pipe P, as shown in Fig. 2, may be extended upwardly so as to enter the container O at a level above the condenser D, the fluctuations of level then occurring in the upper part of the pipe P, whereas the liquid in the container O will always remain at a certain intermediate level.

Figure 3:
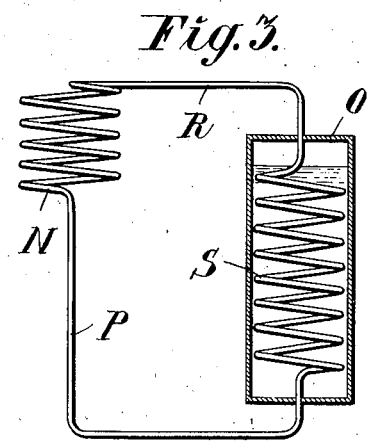
Fig. 3 shows another modification of the secondary system.

Fig. 3 shows a modification of the secondary system ORNP in which the pipes P and R are connected by means of a pipe S formed into a coil and disposed within the container O which, in this case, is filled with a suitable liquid serving only as a means for transferring heat from the absorber C and condenser D to the pipe coil S. Thus, the pipe coil S serves as the vaporizer of the secondary system. As it is not necessary in such case to have the container O hermetically closed at its upper end, this arrangement affords the advantage that the pipes connected with the absorber C and the primary condenser D do not need to be introduced into the container O through gas-tight connections.

Figure 4:
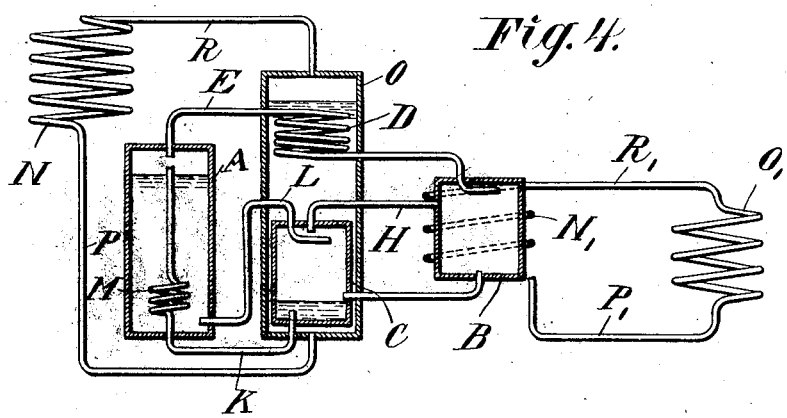
Fig. 4 shows an absorption refrigerating apparatus provided with two vaporization-condensation members in accordance with the invention.

In the refrigerating apparatus shown in Fig. 4 the present invention is also applied for the purpose of conducting heat to the evaporator B of the refrigerating apparatus. For this purpose a hermetically closed circulating system may be used in analogous manner to that described above, said system consisting of a vaporizing element $O_1$, a condenser $N_1$, and connecting pipes $R_1$ and $P_1$, the condenser $N_1$ being in heat exchange relation with the evaporator B of the primary system, whereas the vaporizer $O_1$ is in heat exchange relation with the substance to be cooled or object of refrigeration. The heat carrying agent contained in the circulating system $O_1 R_1 N_1 P_1$ is so chosen that the agent will be caused to boil in the vaporization element $O_1$ while being condensed in the condenser $N_1$. The condenser $N_1$ should be arranged at a higher level than the vaporization element $O_1$ in order to allow the condensed heat transfer agent to flow directly into the vaporization element.

If desired, the secondary system may consist of a pipe closed at both ends, one of which is formed into a condenser coil, whereas the other end forms a vaporizer, being likewise formed as a coil, the circulation being then maintained by condensation of the heat transfer agent in the condenser coil, which is disposed at a higher level, and flow of condensate down into the vaporizer coil in which it is again vaporized and caused to rise to the condenser.

An arrangement in accordance with Fig. 4 may serve as a combined cooling and heating system, the vaporization element $O_1$ then acting as a cooling element, whereas the air-cooled condenser N will serve as a heating element or radiator. The primary system may then, for example, be arranged at a central place in a building, while a number of heating elements or radiators connected in parallel with the container O and a number of cooling elements connected in parallel with the condenser $N_1$ are disposed at different places as desired. Obviously such a combined cooling and heating system will be very economical since the heat which is absorbed by the refrigerating apparatus will be utilized in the heating elements.

It will be understood that the invention is not limited to the specific apparatus described, but that the invention may be applied to various types and kinds of absorption refrigerating apparatus.

I claim:

1. Refrigerating apparatus comprising a generator, an absorber, a refrigerant condenser, an evaporator, all connected by conduits to form a closed system and a second system consisting of a closed hermetically sealed vaporization-condensation cycle comprising a chamber and an air-cooled condenser situated above said chamber and connected thereto, said second system containing a volatile liquid and said refrigerant condenser of the first-mentioned system being contained within said chamber of the second system.

2. Apparatus in accordance with claim 1 wherein the absorber of the first system is also contained within the second system.

3. Apparatus in accordance with claim 1 wherein the first system includes a plurality of conduits connecting the absorber and evaporator and contains a pressure equalizing gas.

4. Apparatus in accordance with claim 1 wherein conduits connecting the generator and absorber pass within the chamber.

5. Refrigerating apparatus comprising a generator, an absorber, a refrigerant condenser, an evaporator, all connected by conduits to form a closed system and a second system consisting of a closed hermetically sealed vaporization-condensation member comprising a chamber and an air-cooled condenser situated above said chamber and connected thereto, said second system containing a volatile liquid and said absorber of the first-mentioned system being contained within said chamber of the second system.

6. Refrigerating apparatus comprising a generator, an absorber, a refrigerant condenser, an evaporator, all connected by conduits to form a closed system and a second system consisting of a closed hermetically sealed vaporization-condensation member comprising a vaporization portion and an air-cooled condenser situated above said vaporization portion and connected thereto, said second system containing a volatile liquid and said refrigerant condenser of the first-mentioned system being in heat exchange relation with said vaporization portion of the second system.

7. Refrigerating apparatus comprising a generator, an absorber, a refrigerant condenser, an evaporator, all connected by conduits to form a closed system and a second system consisting of a closed hermetically sealed vaporization-condensation member comprising a vaporization portion and an air-cooled condenser situated above said vaporization portion and connected thereto, said second system containing a volatile liquid and said absorber of the first-mentioned system being in heat exchange relation with said vaporization portion of the second system.

8. Refrigerating apparatus comprising a primary system including an evaporator, an absorber, a condenser, and means for circulating a refrigerant therethrough, and means for cooling said condenser and said absorber by a common cooling source comprising a closed secondary system partially filled with a volatile liquid and having a part in heat exchange relation with said condenser and a part in heat exchange relation with said absorber.

9. Refrigerating apparatus comprising a primary system including an evaporator, an absorber, a condenser, and means for circulating a refrigerant therethrough, and means for cooling said condenser and said absorber by a common cooling source comprising a closed secondary system partially filled with a volatile liquid and having a part in heat exchange relation with said condenser and a part in heat exchange relation with said absorber and in part exposed to be cooled by air.

10. Refrigerating apparatus comprising a primary system including a plurality of interconnected vessels in which refrigerant is generated, condensed, evaporated and absorbed, and means for conducting heat to and removing heat from said primary system comprising a first closed vaporization-condensation member containing a volatile liquid having a lower portion in heat exchange relation with said primary system, and a second vaporization-condensation member containing a volatile liquid having an upper portion in heat exchange relation with said primary system.

11. In a refrigerating apparatus, an absorber, a condenser situated above said absorber, cooling means for said absorber, said cooling means being connected to said condenser and containing a volatile liquid, whereby heat produced in the absorber produces vapor of the fluid in the cooling means, which vapor is condensed in said condenser, liquid in said cooling means being out of contact with liquid in said absorber.

12. In a refrigerating apparatus, an absorber, an air-cooled condenser situated above said absorber, a cooling member in heat exchange relation with said absorber, a conduit connecting a lower part of said condenser with said cooling member, and a conduit connecting a higher part of said cooling member with said condenser, said condenser and cooling member and connecting conduits containing a volatile fluid, said fluid being gasified in said cooling member and condensed in said condenser.

13. Refrigerating apparatus comprising a primary system including a plurality of interconnected vessels in which refrigerant is generated, condensed, evaporated and absorbed, and means for conducting heat to and removing heat from said primary system comprising a first closed vaporization-condensation member partially filled with a volatile liquid having a lower portion in heat exchange relation with said primary system to receive heat therefrom and an upper portion exposed to be cooled by air, and a second vaporization-condensation member partially filled with a volatile liquid having an upper portion in heat exchange relation with said primary system to supply heat thereto and a lower portion in heat exchange relation with an objective of refrigeration.

14. That improvement in the art of refrigeration by the aid of an absorption system which consists in utilizing heat produced due to change of state of fluid in the system to boil a liquid out of contact with the fluid giving off the heat, conducting vapor of the boiled liquid into heat exchange relation with atmospheric air and thereby condensing the vapor, and conducting the condensate by gravity back into heat exchange relation with the fluid giving off heat.

In testimony whereof I affix my signature.
KARL ALEXANDER WESSBLAD.